United States Patent
Kness et al.

(10) Patent No.: US 7,363,744 B2
(45) Date of Patent: Apr. 29, 2008

(54) INSERT FOR MULTIPLE MOUSE TRAP

(75) Inventors: Lester E. Kness, Des Moines, IA (US); Harry E. Knuppel, Albia, IA (US)

(73) Assignee: Kness Mfg. Co., Inc., Albia, IA (US)

( * ) Notice: Subject to any disclaimer, the term of this patent is extended or adjusted under 35 U.S.C. 154(b) by 0 days.

(21) Appl. No.: 11/536,274

(22) Filed: Sep. 28, 2006

(65) Prior Publication Data

US 2008/0078115 A1  Apr. 3, 2008

(51) Int. Cl.
*A01M 23/10* (2006.01)
*A01M 23/12* (2006.01)
*A01M 23/02* (2006.01)
*A01M 23/00* (2006.01)

(52) U.S. Cl. .............................. 43/74; 43/58
(58) Field of Classification Search ............... 43/74, 43/73, 64, 69–72; 206/467, 470; 220/4.21, 220/4.22, 4.23, 4.24
See application file for complete search history.

(56) References Cited

U.S. PATENT DOCUMENTS

| | | | | |
|---|---|---|---|---|
| 73,254 A | * | 1/1868 | Metcalf | 43/74 |
| 79,154 A | * | 6/1868 | Stamper | 43/74 |
| 99,293 A | * | 2/1870 | Clarkson | 43/74 |
| 102,411 A | * | 4/1870 | Lord | 43/74 |
| 106,107 A | * | 8/1870 | Ball | 43/74 |
| 409,381 A | * | 8/1889 | Worden | 43/74 |
| 420,021 A | * | 1/1890 | Shooter | 43/74 |
| 510,836 A | * | 12/1893 | Carpenter | 43/70 |
| 518,483 A | * | 4/1894 | Bragunier | 43/74 |
| 531,544 A | * | 12/1894 | Leedy | 43/74 |
| 539,900 A | * | 5/1895 | Hulings | 43/74 |
| 616,119 A | * | 12/1898 | Lahann | 43/69 |
| 689,641 A | * | 12/1901 | Douthett | 43/73 |
| 1,067,909 A | * | 7/1913 | Fisher | 43/74 |
| 1,214,060 A | * | 1/1917 | Mutz | 43/74 |
| 1,244,069 A | * | 10/1917 | Neuneker | 43/74 |
| 1,288,712 A | * | 12/1918 | Siemieczko | 43/74 |
| 1,335,882 A | * | 4/1920 | Drag | 43/69 |
| 1,355,264 A | * | 10/1920 | Reppe | 43/72 |
| 1,407,096 A | * | 2/1922 | Spencer | 43/63 |
| 1,432,300 A | * | 10/1922 | Pytlak | 43/72 |
| 1,473,242 A | * | 11/1923 | Marshall | 43/81 |
| 1,479,283 A | * | 1/1924 | Conrad | 43/74 |
| 1,510,346 A | * | 9/1924 | Smith | 43/74 |
| 1,512,513 A | * | 10/1924 | Ward | 43/73 |
| 1,542,673 A | * | 6/1925 | Dale | 43/70 |
| 1,557,558 A | * | 10/1925 | Cherbonnier | 43/69 |

(Continued)

FOREIGN PATENT DOCUMENTS

CA  2167867 A1 *  7/1997

(Continued)

*Primary Examiner*—Darren W. Ark
(74) *Attorney, Agent, or Firm*—McKee, Voorhees & Sease, P.L.C.

(57) ABSTRACT

A mouse or rodent trap including a housing having an elongated rotatable paddle member therein and an insert within the confines of the trap housing. A trigger assembly engages the paddle member and releases the paddle member for rotation when the trigger assembly is engaged by the mouse or rodent entering the housing. The mouse or rodent is then swept into the insert which is then closed and removed.

6 Claims, 3 Drawing Sheets

U.S. PATENT DOCUMENTS

| | | | |
|---|---|---|---|
| 1,645,225 A * | 10/1927 | Brzykcy | 43/74 |
| 1,653,411 A * | 12/1927 | Poe | 43/72 |
| 1,709,199 A * | 4/1929 | Thayer | 43/81 |
| 1,752,041 A * | 3/1930 | Trumbo | 43/70 |
| 1,758,952 A * | 5/1930 | Kness | 43/74 |
| 1,796,380 A * | 3/1931 | Lyden | 43/74 |
| 1,847,508 A * | 3/1932 | Wilkerson | 43/74 |
| 1,880,640 A * | 10/1932 | Wood | 43/74 |
| 2,096,368 A * | 10/1937 | Ward | 43/73 |
| 2,101,788 A * | 12/1937 | Benson | 43/74 |
| D115,876 S * | 7/1939 | Deynzer | 220/4.24 |
| 2,170,470 A * | 8/1939 | Chappell | 43/74 |
| 2,197,121 A * | 4/1940 | Blasen | 43/74 |
| 2,222,653 A * | 11/1940 | Chambless et al. | 43/94 |
| 2,312,209 A * | 2/1943 | Colwell et al. | 43/74 |
| 2,433,913 A * | 1/1948 | Kness | 43/74 |
| 2,437,507 A * | 3/1948 | Crumrine | 43/74 |
| 2,445,166 A * | 7/1948 | Crumrine | 43/74 |
| 2,544,475 A * | 3/1951 | Uttz | 43/81 |
| 2,594,182 A * | 4/1952 | Kness | 43/74 |
| 2,643,480 A * | 6/1953 | Jones | 43/74 |
| 2,683,953 A * | 7/1954 | Hopkins | 43/131 |
| 2,798,784 A * | 7/1957 | Marshall | 220/4.24 |
| 2,869,280 A * | 1/1959 | Dobratz | 43/77 |
| 3,064,386 A * | 11/1962 | Horinek | 43/74 |
| 3,082,927 A * | 3/1963 | Winstead | 220/4.21 |
| 3,177,608 A * | 4/1965 | Lindelow | 43/61 |
| 3,639,021 A * | 2/1972 | Fee | 220/522 |
| 3,645,419 A * | 2/1972 | Shorrock | 220/4.24 |
| 3,769,742 A * | 11/1973 | Spain et al. | 43/81 |
| 3,778,923 A * | 12/1973 | Cuoco | 43/69 |
| 3,975,857 A * | 8/1976 | Branson et al. | 43/61 |
| 3,992,803 A * | 11/1976 | Kaiser | 43/83 |
| 4,030,230 A * | 6/1977 | Souza | 43/81 |
| 4,132,026 A * | 1/1979 | Dodds | 43/131 |
| 4,138,796 A * | 2/1979 | Souza | 43/67 |
| 4,145,834 A * | 3/1979 | Quigley | 43/73 |
| 4,216,606 A * | 8/1980 | Kaiser et al. | 43/83 |
| 4,238,902 A * | 12/1980 | Holl et al. | 43/61 |
| 4,253,264 A * | 3/1981 | Souza | 43/73 |
| 4,281,471 A * | 8/1981 | Jenkins et al. | 43/131 |
| 4,363,184 A * | 12/1982 | Marcolina | 43/85 |
| 4,403,438 A * | 9/1983 | West-Harron | 43/81 |
| 4,418,493 A * | 12/1983 | Jordan | 43/67 |
| 4,429,483 A * | 2/1984 | Murakami | 43/74 |
| 4,452,003 A * | 6/1984 | Deutsch et al. | 206/806 |
| 4,512,474 A * | 4/1985 | Harding | 220/4.23 |
| 4,527,350 A * | 7/1985 | Tockey, Jr. | 206/204 |
| 4,553,349 A * | 11/1985 | Tsai | 43/73 |
| 4,641,456 A * | 2/1987 | Boharski | 43/73 |
| 4,662,102 A * | 5/1987 | Marcolina | 43/85 |
| 4,703,583 A * | 11/1987 | Dzurkovich et al. | 43/82 |
| 4,741,121 A * | 5/1988 | Pratscher et al. | 43/74 |
| 4,753,366 A * | 6/1988 | Ritter | 220/4.23 |
| 4,779,374 A * | 10/1988 | Feldman | 43/81 |
| 4,779,734 A * | 10/1988 | Kydonieus | 206/470 |
| 4,794,723 A * | 1/1989 | Arnold et al. | 43/55 |
| 4,825,579 A * | 5/1989 | Dzurkovich et al. | 43/82 |
| 4,835,902 A * | 6/1989 | Sherman | 43/131 |
| 4,848,577 A * | 7/1989 | Hoffman et al. | 206/467 |
| 4,863,054 A * | 9/1989 | Capetta | 220/4.23 |
| 4,918,855 A * | 4/1990 | Simpson | 43/85 |
| 5,083,704 A * | 1/1992 | Rounthwaite | 43/64 |
| 5,096,084 A * | 3/1992 | Wells | 220/4.22 |
| 5,148,624 A * | 9/1992 | Schmidt | 43/81 |
| 5,176,272 A * | 1/1993 | Ryan | 220/4.23 |
| 5,191,988 A * | 3/1993 | Reil et al. | 220/4.24 |
| 5,235,775 A * | 8/1993 | Daughtry | 43/25.2 |
| 5,265,371 A * | 11/1993 | McCuistion et al. | 43/70 |
| 5,267,411 A * | 12/1993 | Phillips et al. | 43/81 |
| 5,305,545 A * | 4/1994 | Cerullo | 43/74 |
| 5,405,009 A * | 4/1995 | Hackenbracht | 206/470 |
| 5,471,781 A * | 12/1995 | Vine | 43/69 |
| 5,519,962 A * | 5/1996 | Cerullo | 43/72 |
| 5,573,117 A * | 11/1996 | Adams | 206/467 |
| 5,655,706 A * | 8/1997 | Vandiver | 220/787 |
| 5,661,856 A * | 9/1997 | Kyte | 220/4.22 |
| 5,673,509 A * | 10/1997 | Gatewood, Jr. | 43/58 |
| 5,699,913 A * | 12/1997 | Richardson | 206/470 |
| 5,706,601 A * | 1/1998 | Dail | 43/81 |
| 5,755,323 A * | 5/1998 | Zahn et al. | 206/470 |
| 5,779,035 A * | 7/1998 | Marrelli et al. | 206/233 |
| 5,815,982 A * | 10/1998 | Garretson | 43/73 |
| 5,890,594 A * | 4/1999 | Hansen et al. | 206/470 |
| 5,953,853 A * | 9/1999 | Kim | 43/73 |
| 5,964,350 A * | 10/1999 | LaMarche et al. | 206/470 |
| 6,016,623 A * | 1/2000 | Celestine | 43/74 |
| 6,050,420 A * | 4/2000 | Green | 206/467 |
| 6,125,576 A * | 10/2000 | Knuppel | 43/74 |
| 6,161,693 A * | 12/2000 | Findle et al. | 206/470 |
| 6,230,434 B1 * | 5/2001 | Knuppel | 43/74 |
| 6,237,772 B1 * | 5/2001 | LaMarche et al. | 206/470 |
| 6,397,517 B1 * | 6/2002 | Leyerle et al. | 43/58 |
| 6,644,472 B2 * | 11/2003 | Coppedge et al. | 220/4.23 |
| 6,718,688 B2 * | 4/2004 | Garretson | 43/73 |
| 6,758,008 B1 * | 7/2004 | Thebolt | 43/58 |
| 6,889,469 B1 * | 5/2005 | Chung | 43/57.1 |
| 6,920,980 B2 * | 7/2005 | Hwang et al. | 206/470 |
| 6,938,368 B2 * | 9/2005 | Guidry | 43/72 |
| 6,953,118 B2 * | 10/2005 | Seno et al. | 206/764 |
| 6,959,809 B2 * | 11/2005 | Begim | 206/470 |
| 7,051,472 B1 * | 5/2006 | Kelly | 43/58 |
| 7,076,912 B2 * | 7/2006 | Burdette et al. | 43/54.1 |
| 7,204,388 B2 * | 4/2007 | Galland et al. | 206/470 |

FOREIGN PATENT DOCUMENTS

| | | | |
|---|---|---|---|
| DE | 29714535 U1 * | 10/1997 | |
| DE | 29721949 U1 * | 2/1998 | |
| DE | 19729204 C1 * | 9/1998 | |
| GB | 1461276 A * | 1/1977 | |
| GB | 2056244 A * | 3/1981 | |
| GB | 2156646 A * | 10/1985 | |
| GB | 2423002 A * | 8/2006 | |
| WO | WO 9200671 A1 * | 1/1992 | |

* cited by examiner

INSERT FOR MULTIPLE MOUSE TRAP

FIELD OF THE INVENTION

The present invention relates generally to animal traps and more particularly to a mouse trap having an insert which provides for safely and cleanly disposing of rodents such as mice and rats.

BACKGROUND OF THE INVENTION

Mouse and rodent traps have been designed in many ways throughout the years. Some of the earlier animal traps include those disclosed in U.S. Pat. No. 1,758,852 dated May 20, 1930; U.S. Pat. No. 2,433,913 dated Jan. 6, 1948; and U.S. Pat. No. 6,125,576 dated Oct. 3, 2000. Each of these mouse or rodent traps generally sweeps a rodent or mouse into an area of a trap in which the rodent cannot escape. Typically, the area in which the mouse is swept into is an interior cavity of the housings of the mouse trap.

Because the rodents are alive when they are swept into the trap, the rodent caught within the trap will continue to produce excrement that dirties the interior surface of the trap. The rodent typically also shed hair within the confines of the trap. Additionally, if the rodent has been injured while being swept into the confines of the traps, there is the potential for blood to be found on the interior surface.

Each of the aforementioned contaminants pose potential health hazards to humans. Hantavirus Pulmonary Syndrome (HPS) is a rare, but serious life-threatening disease that results mainly through the inhalation of tiny airborne droplets of fresh or dried droppings, urine, or saliva left by infected rodents. Mouse hair can also carry the virus as it is often coated with rodent excrement and saliva. HSP is contracted by having direct contact with the rodent excrement and the subsequential touching, scratching or rubbing of the nose, mouth or eye region. It has been reported that 38% of all reported HSP victims in the U.S. have died because of exposure to the Hantavirus. Over 300 cases have been diagnosed since May 1993.

In addition to the potential lethal Hantavirus, rodents are also known to carry the West Nile Virus and Arana Virus. Rodents also can be carriers of other pests, i.e., fleas that can be secondary carriers of additional diseases. The Center for Disease Control has indicated that nearly 18% of inner city children are allergic to proteins found in mouse urine.

It is therefore a primary feature of the present invention to provide a design for a mouse trap that has a removable insert for storing captured rodents.

A further feature of the present invention is to provide an insert comprised of an upper and lower half.

A further feature of the present invention is utilizing a living hinge to connect the upper and lower halves of an insert for a mouse or rodent trap.

Yet another feature of the present invention is the provision of handles via depressions in the upper and lower halves of the rodent trap insert.

Still another feature of the present invention is the inclusion of interlocking parts on the upper and lower halves of the insert that facilitate creation of a container to contain a trapped rodent.

Another feature of the current invention is the provision of a disposable insert.

A further feature of the current invention is to provide an insert that can be formed of an opaque material that hinders the viewing of a trapped rodent or rodents within the container formed by the insert.

Another feature of the present invention is the inclusion of attack holes in the trap housing to distract the rodent from chewing on the insert and focusing its attention on the metal housing.

Yet a further feature of the present invention is the provision of a method of trapping a mouse within an insert of a mouse or rodent trap to facilitate removal of the rodent without having to touch the trapped rodent.

An insert for a mouse or rodent trap and a method of accomplishing these and other features will become apparent from the following description of the invention.

BRIEF SUMMARY OF THE INVENTION

The present invention relates to a clam-shelled insert within a mouse or rodent trap that facilitates removal of a trapped rodent from the trap without having to touch the rodent. Preferably, the insert is utilized with a mouse or rodent trap that includes a housing having an elongated rotatable paddle member within the housing. The paddle member is typically connected to a trigger assembly that releases the rotatable paddle when a mouse or rodent steps upon the trigger assembly. When the rotatable paddle rotates, it sweeps the mouse or rodent into a holding area within the confines of the trap housing.

The holding area of the present invention is designed to receive the clam-shelled insert. This insert is typically made of a disposable plastic with two halves connected by a living hinge. After the mouse or rodent is swept into the confines of the clam shell, the two halves can be pressed together to form a closed container about the rodent. This enables an individual to easily remove the rodent from the confines of the trap without letting it escape. The mouse or rodent is effectively confined to the interior of the clam shell.

The clam shell insert is formed to easily fit within one end of the trap housing. When it is in the open position, it is preferable that the lower half of the insert fit against the lower edge of the opening that the rodent passes through. Additionally, the upper half of the clam shell can be fitted above the upper edge of the opening to the rotatable paddle and a formed slot that prevents the upper edge of the clam shell from prematurely closing. Further yet, attack holes are positioned in the housing walls to distract the mouse or rodent from chewing on the plastic of the clam shell.

The plastic clam shell insert is formed with two generally elongated triangular shaped halves that are generally symmetrical to each other. Ideally, hand holds or depressions are formed in the exterior surface of the clam shell to facilitate easy and a consistent removal of the trapped rodent within the closed clam shell. Additionally, the long edge of each half of the clam shell is formed with inter-locking tabs and protrusions that hold the clam shell container closed after it has been removed from the confines of the trap housing. Additional grooves and/or depressions can be utilized in the formation of the clam shell insert to facilitate easy insertion and removal of the insert within the confines of the trap.

DETAILED DESCRIPTION OF THE PREFERRED EMBODIMENT

Figure 1:
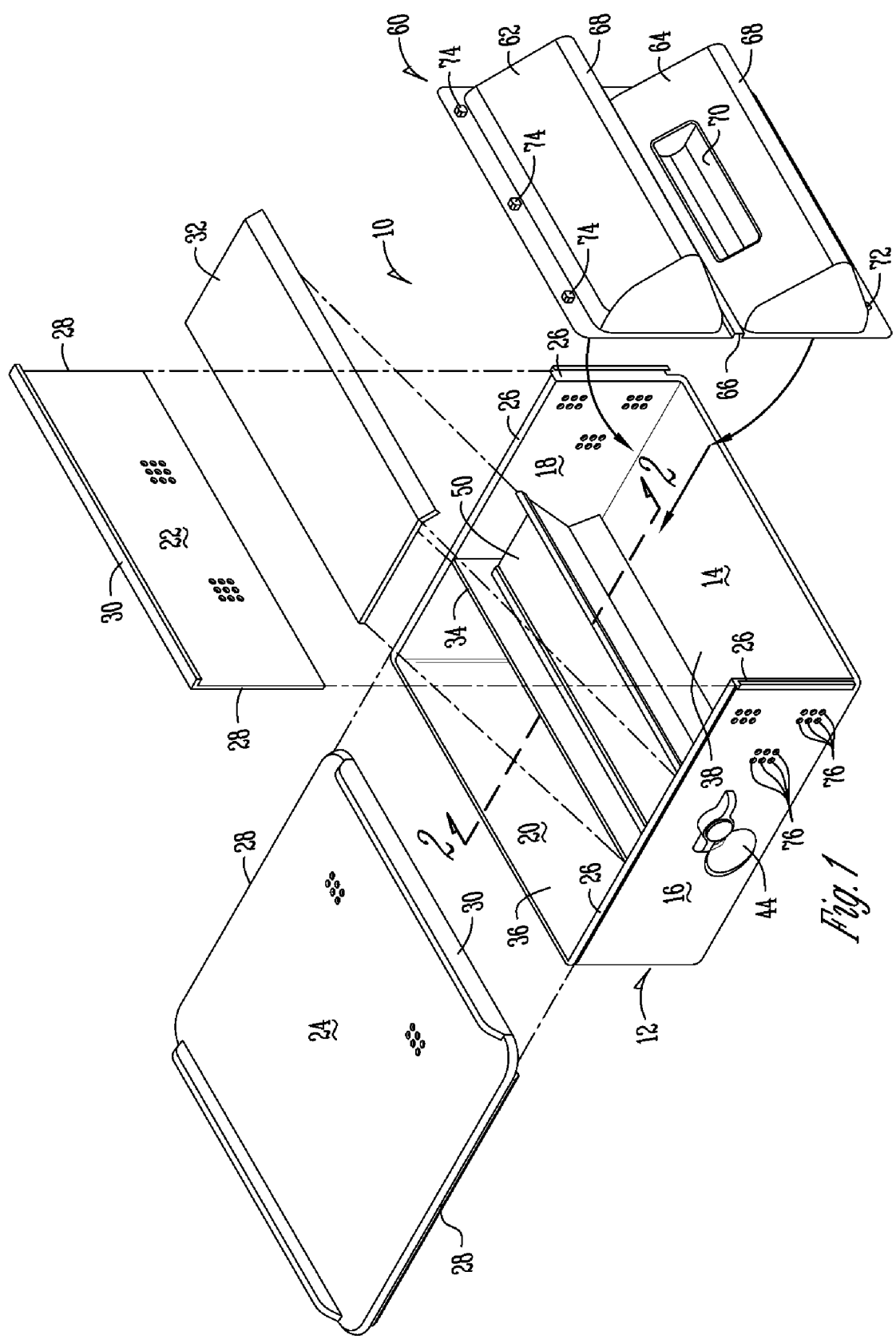
FIG. 1 is an exploded view of an embodiment of an insert in a mouse or rodent trap.

The present invention is described as it applies to its preferred embodiment. It is not intended that the present invention be limited to the described embodiment. It is intended that the invention cover all modifications and alternatives, which may be included within the scope of the invention.

Referring to the drawings, the numeral 10 generally designates a mouse or rodent trap. Trap 10 includes a housing 12 having a bottom wall 14, side walls 16, 18, and end walls 20, 22. The upper and end edges of side walls 16 and 18 include side flanges 26 which are adapted to engage slide tracks 28 on the opposite sides of the top cover 24 and removable end wall cover 22. Top cover 24 and the end wall cover 22 are also provided with handles 30 for facilitating the sliding movement of the covers 22 and 24. Each of the walls and/or covers may be constructed as a whole or independently of metal, plastic or wood and may be either opaque or transparent.

Figure 2:
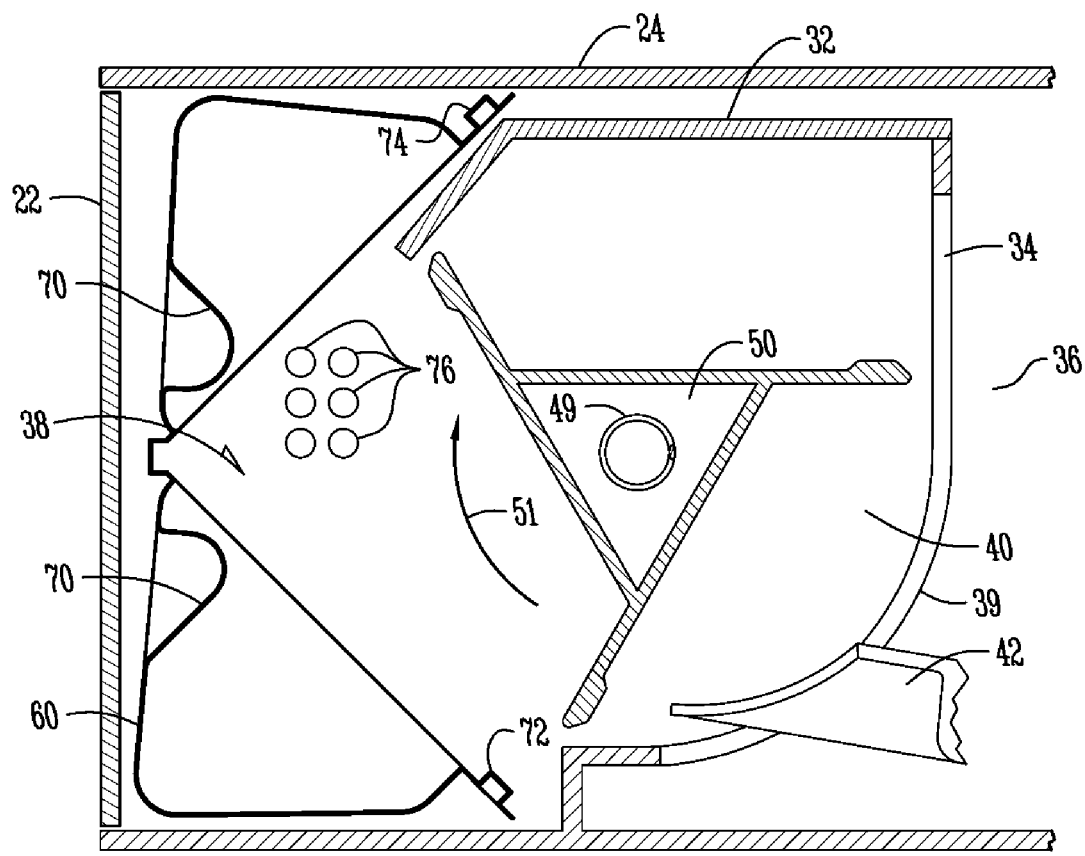
FIG. 2 is an end view of the central compartment, paddle, and trap compartment of the mouse or rodent trap.
Figure 3:
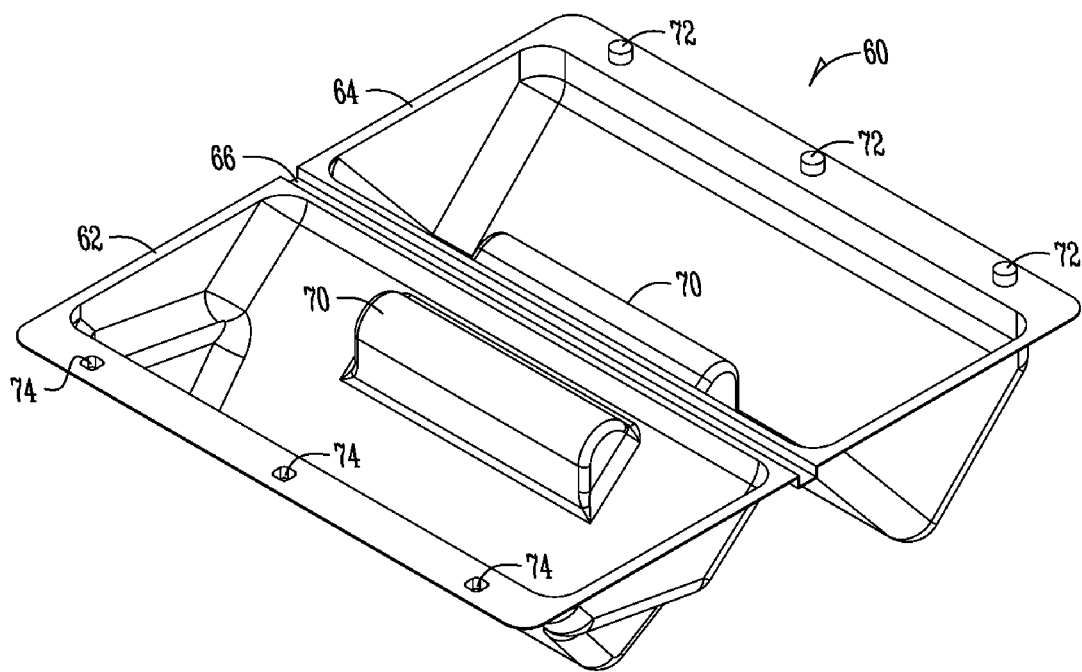
FIG. 3 is a perspective view of an insert for a mouse or rodent trap in an open position.

The housing 12 includes an upper partition 32 and a rear partition 34 which together form a rear compartment 36 and a trap compartment 38, as seen in FIG. 2. The rear partition 34 includes a curved portion 39 which is adjacent a paddle member 50. Side walls 16 and 18 are provided with a hole 44 therein for permitting a mouse or rodent to enter a central compartment 40 formed between the paddles 50 and curved portion 39 of the trap's rear partition 34. A spring 49 yieldably urges the paddle 50 in a first rotational direction designated by arrow 51.

The paddle 50 is engaged by a trip assembly 42 that holds the paddle 50 in rotational position. When the trip assembly is stepped upon/depressed by a rodent, the paddle 50 rotates in the direction of arrow 51. When the paddle 50 is rotated, the rodent or mouse is swept out of the central compartment 40 and into the trap compartment 38.

A clam shell insert 60 within the trap compartment 38 receives the mouse. FIG. 1 shows the insert 60. The insert 60 has an upper half 62 and a lower half 64 separated by a living hinge 66. The insert's 60 upper half rests against the upper partition 32 and the top cover 24. The lower half 64 rests against the bottom wall 14 of the rodent trap 10. The rearward portions 68 of the upper and lower half 62 and 64 are positioned within the trap compartment 38 such that they are positioned against the removable rear wall 22.

The rear portion 68 of the two halves can be formed with depression 70 that facilitates closing and removal of the insert 60 when at least one mouse or rodent is trapped within the trap chamber 38. Preferably, the depressions 70 are formed with enough space to allow multiple fingers to be used to remove the insert 60. Other depression shapes or numbers of depressions may be used to facilitate the closure and removal of the insert 60 from the trap 10.

Figure 4:
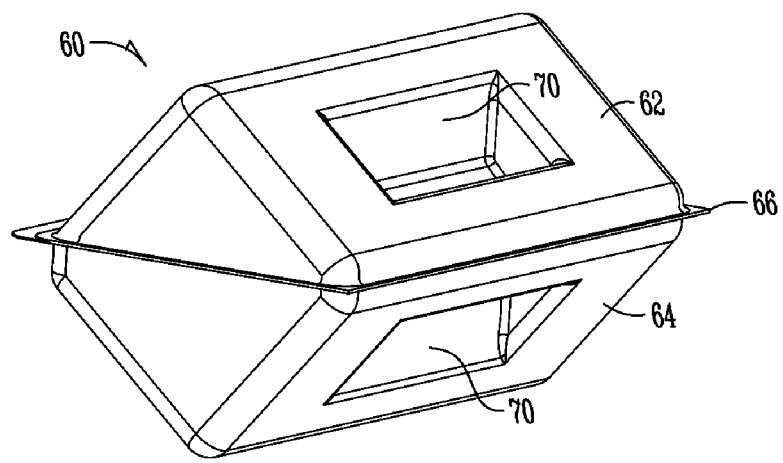
FIG. 4 is a perspective view of an embodiment of an insert for a mouse or rodent trap in the closed position.

Tab 72 and corresponding protrusion 74 can be utilized to seal the insert 60 in a closed position (as seen in FIG. 4). Other methods of interlocking/sealing the two halves together could include tabs and slots, adhesives or an external seal that could hold the two halves together. Additionally, the two halves 62 and 64 could be held together by a rubber band or string looped about the exterior of the insert.

It is preferable that the two halves 62 and 64 are formed such that when they are inserted into the trap compartment 38 that the halves 62 and 64 leave exposed attack holes 76, as seen in FIG. 2. These holes are formed in the side walls 16 and 18 to provide distractions to the rodent within the trap compartment 38. A mouse or rodent constantly chews on objects to continually sharpen their front teeth. To prevent the rodent or mouse from chewing at the insert 60, the holes 76 are formed in the sides 16, 18 to provide a surface made of more resilient material than the disposable insert 60 to sharpen their teeth upon.

The trap 10 is preferably used with an insert by first inserting the insert 60 into the confines of the trap compartment 38 of the trap 10. The covers 22 and 24 are then replaced on the trap 10. The trigger mechanism is then set and the trap 10 is placed in a likely place that rodents travel. When a rodent travels through the hole 44 and triggers the assembly, the paddle 50 rotates to sweep the mouse into the trap compartment 38 and insert 60.

After the mouse is trapped within, the end cover 22 is removed. The operator then inserts their fingers into the handles or depressions 70 of the insert while pressing the two halves 62 and 64 together. The mouse or rodent is then trapped within the insert 60. The two halves are then sealed together via the sealing mechanism and the entire package (with mouse or rodent trapped within) is then disposed of. The operator's hands never come in contact with the mouse or fecal matter of the rodent. All the aforementioned are removed at the same time, leaving the interior of the trap 10 relatively clean. The process is then repeated by inserting a new insert 60.

A general description of the present invention as well as the preferred embodiment and alternative embodiments of the present invention have been set forth above. Those skilled in the art to which the present invention pertains will recognize and be able to practice additional variations in the methods and systems described which fall within the teachings of this invention.

What is claimed is:

1. A rodent trap comprising:
   a housing having first and second opposite ends, an upper wall, a lower wall, a rear wall and an entrance opening;
   a partition within the housing forming a trap compartment that is defined by a portion of the upper wall, a portion of the lower wall, and the rear wall of the housing and by the partition;
   a clam shell within the trap compartment having an upper half and a lower half separated by a living hinge, the clam shell having the upper half thereof being adjacent the portion of the upper wall, the lower half thereof being adjacent the portion of the lower wall defining the trap compartment;
   an elongated paddle member within the housing having a central axis and a plurality of paddles extending outwardly in a radial direction, the paddle member being mounted within the housing for rotation about the central axis;
   a spring urging the paddle in a first rotational direction;
   a trip member depressible by the rodent entering the housing through the opening therein from an untripped position holding the paddle against rotational movement to a tripped position permitting the paddle member to rotate, causing the paddles to rotate and sweep the live rodent into the trap compartment;
   the clam shell being in an open position within the trap compartment and being movable in response to manipulation by an operator to a closed position wherein the upper and lower halves hinge about the living hinge and move into sealed relationship with one another to trap the live rodent within the clam shell without having to touch the live rodent.

2. The rodent trap according to claim 1 wherein the upper and lower halves of the clam shell each have rearward portions which are facing the rear wall of the housing.

3. The rodent trap according to claim 2 wherein the rearward portion of the upper half includes an upper depression therein and the rearward portion of the lower half includes a lower depression therein, the upper and lower depressions facilitating the moving of the clam shell to the closed position.

4. A method for trapping a rodent in a trap, comprising:
taking a housing having first and second opposite ends, an upper wall, a lower wall, a rear wall and an entrance opening;
placing a partition within the housing to form a trap compartment that is defined by a portion of the upper wall, a portion of the lower wall, and the rear wall of the housing and by the partition;
putting a clam shell within the trap compartment, the clam shell having an upper half and a lower half, the upper and lower halves of the clam shell being separated by a living hinge;
positioning the clam shell within the trap compartment so that the upper half thereof is adjacent the portion of the upper wall and the lower half thereof is adjacent the portion of the lower wall defining the trap compartment;
rotating an elongated paddle member within the housing about a central axis, the paddle member having a plurality of paddles extending outwardly in a radial direction;
urging the paddle in a first rotational direction;
depressing a trip member by the rodent entering the housing through the opening therein from an untripped position holding the paddle against rotational movement to a tripped position permitting the paddle member to rotate, thereby causing the paddles to rotate and sweep the live rodent into the trap compartment; and
moving the clam shell in response to manipulation by an operator from an open position within the trap compartment to a closed position wherein the upper and lower halves hinge about the living hinge and move into sealed relationship with one another to trap the live rodent within the clam shell without having to touch the live rodent.

5. The method according to claim 4 and further comprising facing the rear wall of the housing with a rearward portion of the upper half and a rearward portion of the lower half of the clam shell.

6. The method according to claim 5 and further comprising forming an upper depression in the rearward portion of the upper half of the clam shell and forming a lower depression in the rearward portion of the lower half of the clam shell and facilitating the movement of the clam shell to the closed position by using the upper and lower depressions.

* * * * *